United States Patent [19]

Oudet et al.

[11] Patent Number: 5,512,871
[45] Date of Patent: Apr. 30, 1996

[54] ROTATABLE SINGLE-PHASE ELECTROMAGNETIC ACTUATOR

[75] Inventors: Claude Oudet, Besancon; Daniel Prudham, Thise, both of France

[73] Assignee: Moving Magnet Technologies S.A., Besancon, France

[21] Appl. No.: 348,163

[22] Filed: Nov. 28, 1994

Related U.S. Application Data

[63] Continuation of Ser. No. 75,511, filed as PCT/FR91/01013; Dec. 16, 1991, abandoned.

[30] Foreign Application Priority Data

Dec. 17, 1990 [FR] France .................. 90 15782

[51] Int. Cl.⁶ .................. H01F 7/08; H01F 1/00; H02K 5/16; H02K 7/10
[52] U.S. Cl. .................. 335/220; 335/219; 335/225; 335/272; 335/276; 310/90; 310/75 D
[58] Field of Search .................. 335/220, 225, 335/272, 276; 310/90, 75 D, 67 A, 75 C

[56] References Cited

U.S. PATENT DOCUMENTS

| | | | |
|---|---|---|---|
| 3,579,276 | 5/1971 | Newell | 310/82 |
| 3,794,865 | 2/1974 | Guttinger | 310/82 |
| 3,807,813 | 4/1974 | Milligan . | |
| 4,255,682 | 3/1981 | Toida | 310/168 |
| 4,371,817 | 2/1983 | Muller | 318/254 |
| 4,518,883 | 5/1985 | Oudet | 310/49 R |
| 4,633,149 | 12/1986 | Welterlin | 318/254 |
| 4,682,067 | 7/1987 | Oudet | 310/156 |
| 4,714,854 | 12/1987 | Oudet | 310/268 |
| 4,728,833 | 3/1988 | Shiraki | 310/68 R |
| 4,782,255 | 11/1988 | Oosaka | 310/68 R |
| 4,823,040 | 4/1989 | Oudet | 310/268 |
| 4,837,474 | 6/1989 | Peterson | 310/254 |
| 4,839,551 | 6/1989 | Tomisawa | 310/90 |
| 5,053,667 | 10/1991 | Oudet | 310/268 |
| 5,298,825 | 3/1994 | Oudet | 310/156 |
| 5,300,849 | 4/1994 | Elsasser | 310/90.5 |

FOREIGN PATENT DOCUMENTS 910798  3/1954  Germany .
923016  1/1955  Germany .

*Primary Examiner*—Leo P. Picard
*Assistant Examiner*—Stephen T. Ryan
*Attorney, Agent, or Firm*—Oblon, Spivak, McClelland, Maier & Neustadt

[57] ABSTRACT

A constant-torque single-phase electromagnetic actuator including a stationary device including a first magnetic stator circuit made of a high-permeability material and excited by at least one field coil (10), and a movable device (1) including an axially magnetized disc (3) having 2N pairs of magnetic poles magnetized in alternate directions, wherein the magnetization is substantially uniform. The magnetized disc (3) is attached to a second magnetic circuit (6) made of a high-permeability material, and the movable device is provided with a coupling shaft (7). The connection between the stationary device (1) and the movable device (2) allows at least some axial play of the coupling shaft (7) away from the stationary stator device (2), and the diameter of the magnetized disc (3) is substantially identical to that of the poles of the stator circuits. Play between the stationary (2) and Movable (1) devices is compensated by the magnetic attraction exerted by the stationary device on the movable one.

3 Claims, 4 Drawing Sheets

ROTATABLE SINGLE-PHASE ELECTROMAGNETIC ACTUATOR

This application is a Continuation of application Ser. No. 08/075,511, filed on Oct. 21, 1993, now abandoned, which was filed as International Application No. PCT/FR91/01012 on Dec. 16, 1991.

BACKGROUND OF THE INVENTION

1. Field of the Invention

The present invention concerns a rotating single-phase electromagnetic actuator.

2. Related Art

The state-of-the-art encompasses numerous types of rotating single-phase actuators comprising a stationary device consisting of a first magnetic stator circuit made of a very high-permeability magnetic material excited by at least one trip coil and a movable device formed by an axially-magnetized disk. This magnetic disk has 2N pairs of magnetic poles magnetized in alternating directions. Magnetization is virtually uniform. The magnetized disk is coupled to a second circuit made of a high-permeability material. The movable device is equipped with a coupling shaft designed to transmit torque.

As an example, actuators of this kind are described in Applicant's French Patent (No. 8908052).

Because of miniaturization of actuators and of the precision and reliability required for the majority of real life applications, the positioning of the movable device is critical. Consequently, various mechanical solutions allowing the precise positioning of the shaft and/or rotor have been proposed as part of the art. The principle consistently underlying these solutions lies in reducing the play between the shaft and an actuator-assembly structure as much as possible.

These solutions entail different problems. First, these solutions are expensive, since they require the use of high-precision mechanical systems forming movable parts subject to wear and thus possibly reducing the life and/or reliability of the actuator thus produced.

Moreover, the solutions known in the prior art produce significant rigidity of the unit. Now, actuators are designed to be coupled to mechanical assemblies which may be off-center or have various alignment defects. The absence of any flexibility intrinsic to the actuator thus dictates, in some cases, the use of flexible couplings whose space requirement and cost price may pose problems.

The purpose of the present invention is to solve these difficulties by proposing a solution proving surprising and unexpected results to the specialist who is a person skilled in the art.

SUMMARY OF THE INVENTION

The invention forming the object of the present patent application concerns, to this end, an actuator characterized by the fact that the connection between the stationary and movable devices permits at least axial motion of the movable device in the direction opposite the stationary stator device, and by the fact that the diameter of the magnetized disk is substantially identical to the diameter of the two magnetic circuits. Axial position-retention of the movable device is assured by magnetic forces of attraction between the stationary and movable devices, these forces proving sufficient to ensure satisfactory operation of the actuator thus produced and imparting to the actuator a flexibility sufficient to absorb alignment defects in line with assembly and/or manufacturing tolerances. The means providing mechanical attachment of the movable device and the stationary part of the actuator is designed to allow some play, in the absence of magnetic attraction, whose order of magnitude corresponds to the distance between the surface of the movable magnet and the surface of the stationary stator component. In actuators whose diameter is approximately one centimeter, this mechanical axial play measures several tenths of millimeters. Play of this magnitude would be unacceptable if it were not counterbalanced. Therefore, an important feature of the actuator according to the invention is the absence of a mechanical part ensuring by itself the precise positioning of the movable device, and, consequently, the exact specification of the air-gap. In actuators according to the invention, this positioning is ensured by the combination of the magnetic phenomena exerting an axial force of attraction of the movable device toward the stationary stator component and of lateral centering, on the one hand, and the action exerted by a stop allowing a degree of rotational freedom and limiting the axial movement of the movable device toward the stationary stator component. This stop consists of a thrust ball bearing, a removable oblique bearing, or any other equivalent mechanical means capable of allowing a degree of rotational freedom and performing an axial stop function.

According to an advantageous embodiment, the connection between the stationary and the movable devices further permits a radial motion of the coupling shaft when acted upon by interference stresses associated with manufacturing and charge-coupling tolerances.

This solution, surprising to the specialist, who would be more likely to try to perfect guidance of the movable device, makes it possible to bring about strong, efficacious self-centering of the movable device in the absence of any moving part, except for a stop preventing the movable device from adhering to the stationary device. The magnetic forces tend to cause the movable device to return to the centered position, despite the lack of guide or mechanical return means, and thus to counterbalance both angled and parallel motion resulting from the actuator-manufacturing and charge-coupling tolerances.

In accordance with this feature, the geometric axis of the rotor, and consequently, of the coupling shaft, possesses flexibility sufficient to counterbalance defects of alignment with the output shaft.

The movable device preferably works in conjunction with the stationary device by means of a thrust ball bearing which restricts motion of the movable device toward the stationary device, or by means of a removable oblique contact bearing. A removable oblique contact bearing possesses an axial load-carrying capacity comparable to the axial load-carrying capacity of a thrust ball bearing of equivalent size, but it removes any possibility of lateral play.

According to a first modification of the invention, one of the exterior surfaces of the thrust ball bearing is substantially coplanar with the plane passing through the ends of the stator poles, the disk comprising a central recess whose section is at least equal to the section of the thrust ball bearing. This embodiment makes possible a reduction of the space requirement of the actuator. Furthermore, it avoids the need for a shaft passing through the stationary part, thereby simplifying the coil of the stationary magnetic circuit.

The upper ends of the stator poles of the stationary device preferably incorporate a substantially cylindrical bore, in which a connection piece made of a non-magnetic material is placed, this connection piece working in conjunction with the thrust ball bearing. The bore thus produced delimits segments shaped like annular sectors forming a support for the connection piece.

According to one special second modification, the coupling shaft passes through the stationary device. The latter has, on the side on which coupling axis emerges, one or several threadings which facilitate attachment of the actuator to a mechanical support. However, the trip coil for the actuator according to this modification is more difficult to produce.

BRIEF DESCRIPTION OF THE DRAWINGS

Other embodiments and advantages will emerge more clearly from the description of a non-limiting example of an actuator according to the present invention, provided with reference to the drawings in which.

DETAILED DESCRIPTION OF THE PREFERRED EMBODIMENTS

Figure 1:
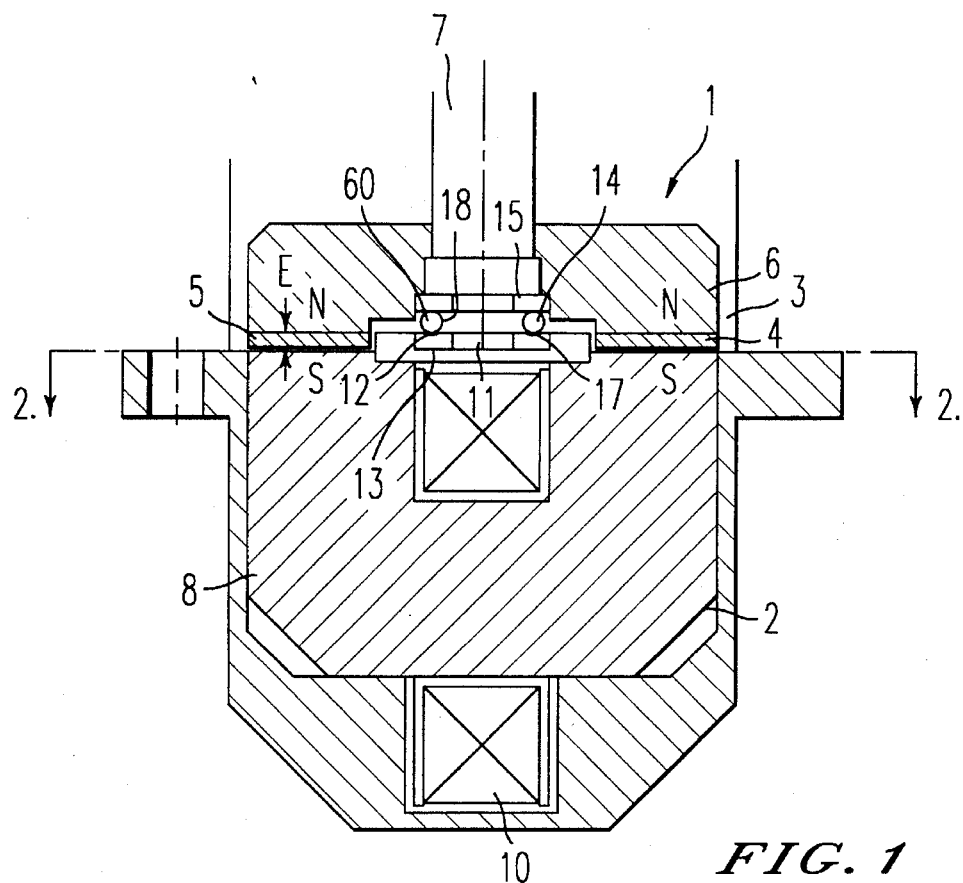
FIG. 1 is an axial cross-section of the actuator according to the invention.

FIG. 1 is an axial cross-section of an actuator according to a first embodiment of the present invention.

The actuator consists of a movable device 1 and a stationary device 2. The movable device comprises a thin disk-shaped magnet 3 made of NdFeB and magnetized in the direction of its thickness. It comprises two sectors 4, 5 magnetized in opposite directions. The magnetized disk 3 incorporates two sectors, each of which forms one half-disk extending over 180°, when maximum travel is sought. When a lesser course of travel is considered satisfactory, this angle may be reduced to approximately 150° to 160°. The disc 3 may be produced using different conventional, state-of-the-art methods, e.g., by magnetization of a disk made of Neodymium-Iron-Boron using a magnetization head, or by using two preliminarily-magnetized half-disks. If the travel required allows use of magnetized sectors having an angle of less than $\pi/N$, it is preferable to use separate parts, rather than to leave large dead zones in the magnet. For example, when N= 1, if the travel required is only 90°, two sectors making up 150° and spaced apart by 30° can be used.

For low-cost actuators possessing a low level of torque in relation to size, permanent ferrite magnets, although more fragile, may be used.

In the embodiment described, the magnet disc 3 is glued to a mobile stator circuit 6 fastened to the coupling shaft 7. The stationary stator element 2 and the movable stator element 6 are formed by injection of a mixture of powdered iron and a plastic binding agent, the latter then being evaporated in an oven to cause homothetic contraction. These parts can also be made of machined, sintered and/or molded soft iron or of a heavy iron-nickel alloy.

The stationary device 2 is wound using contiguous turns. The medial plane of the coil 10 corresponds to the transverse plane of the actuator containing the axis of rotation. This solution is, however, suitable only for actuators in which the stator comprises two poles. For actuators incorporating four-pole stators, the state-of-the-art provides the specialist with different winding solutions, of which one example will be explained in the following part of the description.

The dimensions of the stationary magnetic circuit 8 and of the movable magnetic circuit 6 are conventionally determined so as to allow passage of the entirety of the magnetic flux affecting the amperes-turns as determined, taking into account temperature conditions and without saturation.

The linkage between the movable part 1 and the stationary part 2 is effected by means of a thrust ball bearing 11 delimiting the air-gap. The thrust ball bearing 11 consists of a ring 12 having an annular ball race 13, which work in conjunction with balls 14. These balls 14 are arranged between this first ball race 13 and a second ring 15 attached to the movable device 1. The ball race 13 has a groove 17 designed to position the balls. The ring set opposite this ball race has a flat surface 18 in contact with the balls. The external diameter of the thrust ball bearing is substantially equal to the internal diameter of the magnet bore, so as to effectively confine the stresses exerted on the shaft 7.

Depending on the application under consideration, only a single ball race, or both ball races, will have a groove. When the coupling shaft is liable to be subjected to an appreciable radial force, importance is preferably given to the "torque" component over the "lateral motion" component. This situation occurs, most notably, when the coupling axis works in conjunction with the load by means of a gear. In this case, the solution in which each of the ball races has a groove will preferably be chosen.

On the other hand, when the actuator is designed to activate an indicator needle or to drive directly the shaft of the adjustment flap of the air intake of an internal combustion engine, for example, the solution in which one only of the ball races has a groove will preferably be adopted, in order to allow lateral motion and to limit wear over time resulting from compensation for angled torque.

Figure 2:
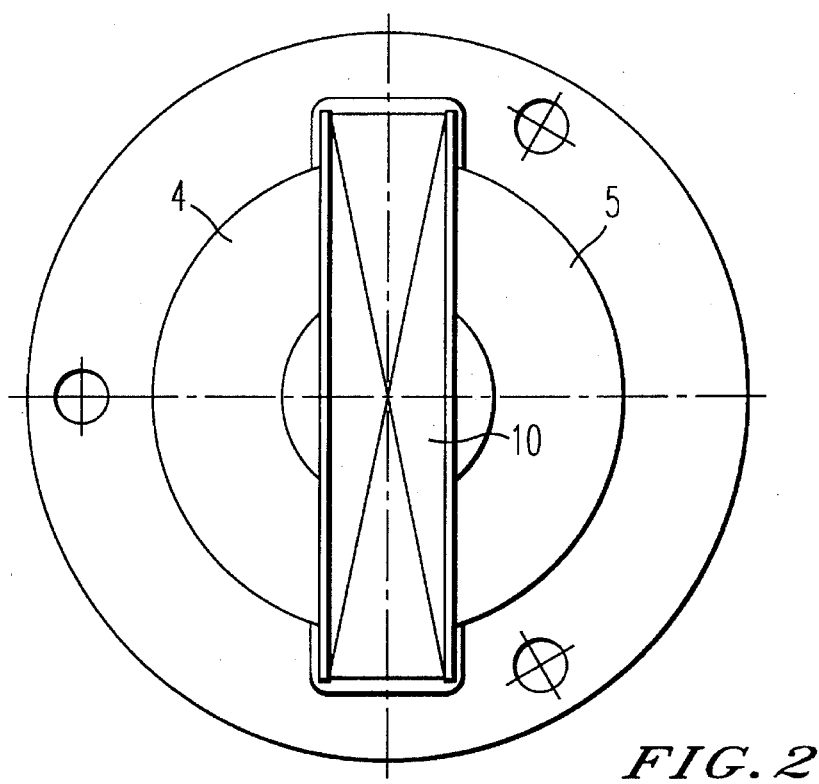
FIG. 2 is a transverse cross-section.

FIG. 2 illustrates a transverse cross-section along A-A' The stationary magnetic circuit 8 equipped with a coil 10 is shown in a different plane.

The actuator functions in the following way. The movable device 1 tends to travel until the potential of the magnets and magnetic poles are added together, in consideration of the P/E ratio, in which:

P is the width of the pole as measured on the average radius, and

E designates the size of the air-gap, i.e., the distance between the iron parts of the stator and rotor, the magnet being absent.

This P/E ratio must be large, so as to specify an actuator which supplies a constant torque over a significant proportion of the maximum theoretical angle of operation with a given marking current equal to $\pi/N$. When N= 1 and P/E= 10, a course of travel under constant torque of more than 110° can be delimited. In practice, P/E must be greater than 4.

Figure 3:
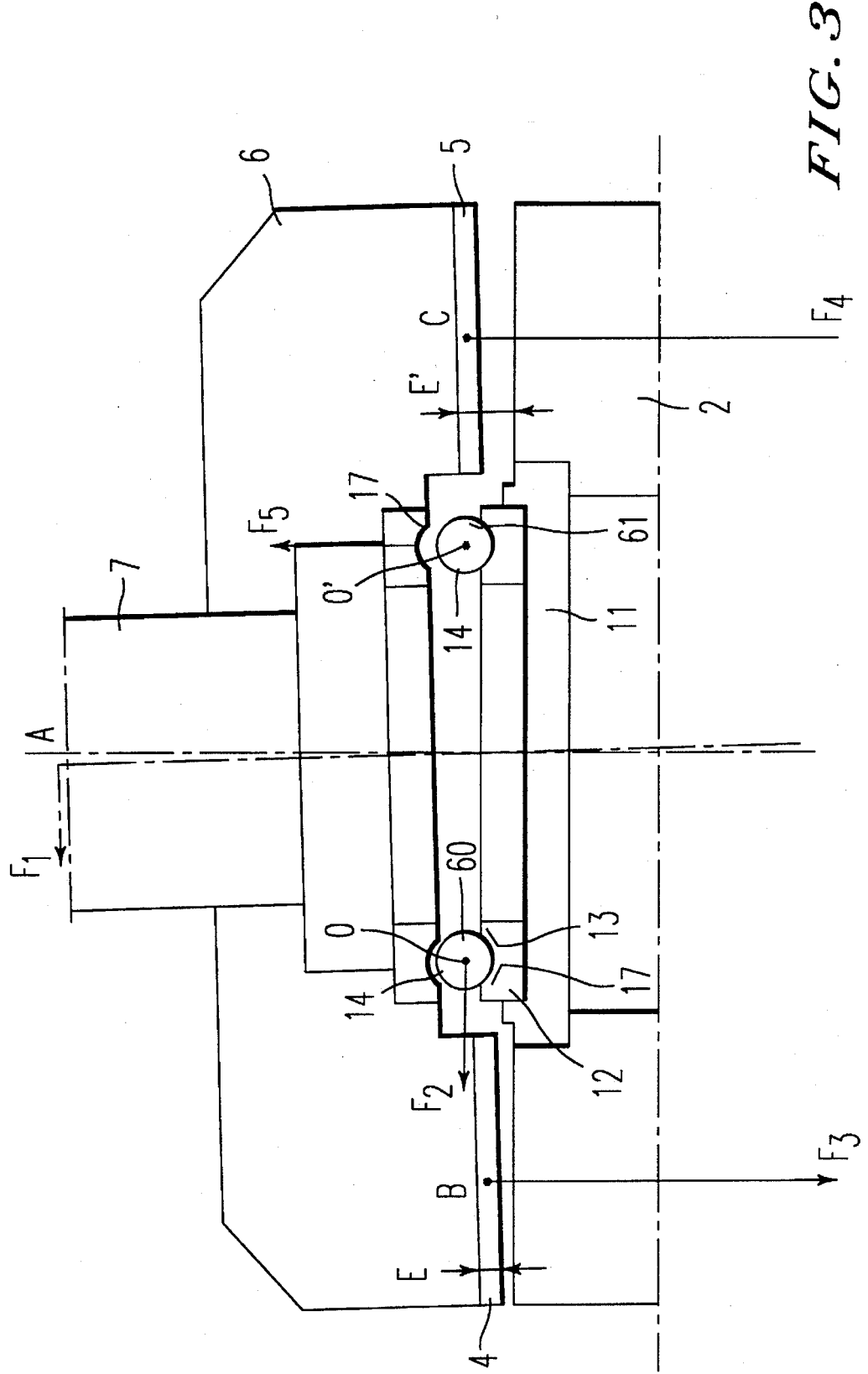
FIG. 3 illustrates the actuator when a lateral force is exerted on the shaft.

FIG. 3 illustrating a partial view of the actuator shows what happens when a radial force $F_1$ is applied at A to the output axis 7. We accept the fact in the following description that $F_1$ causes the rotor 1 to pivot around the center O of one of the balls 60. The air-gap is reduced on the side on which the ball 60 is positioned, and increases on the opposite side. The force $F_1$ decomposes at point O, first, into a force $F_2 = F_1$, which tends to causes the ball 60 to leave its groove 17, and, second, into a torque. The force $F_2$ is virtually never sufficient to cause one ring belonging to the thrust ball bearing to slide in relation to the other. Moreover, the force of attraction $F_3$ generated at the site where the air-gap is smallest is greater than the force $F_4$ generated at the site diametrically opposite. However, since the lever OC is much larger than the lever OB, the torque resulting from $F_4$ prevails over the reverse torque resulting from $F_3$. For this reason, advantage will be gained by choosing a ball race as large as possible, given the proximity of the magnet. The return to a position of equilibrium can thus be optimized, since the arm of the lever OB is shortened and the arm of the lever OC is increased. Because the magnetic force of attraction $F_4$ is generally much greater than the interference force $F_1$ and the lever arm is of the same order of magnitude, the rotor cannot remain in the pivoted position shown in FIG. 3, and tends to come back into contact with the ball 61 having center O', until the force of reaction $F_5$ is generated so that the sum of the torques applied is zero and the rotor is thus in its normal, stable position. The actuator described may thus function perfectly using a bearing consisting of a single thrust ball bearing. If the interference forces $F_1$ remain weak in all cases, an actuator may even be produced in which one of the bearing collars has no grove.

Figure 4:
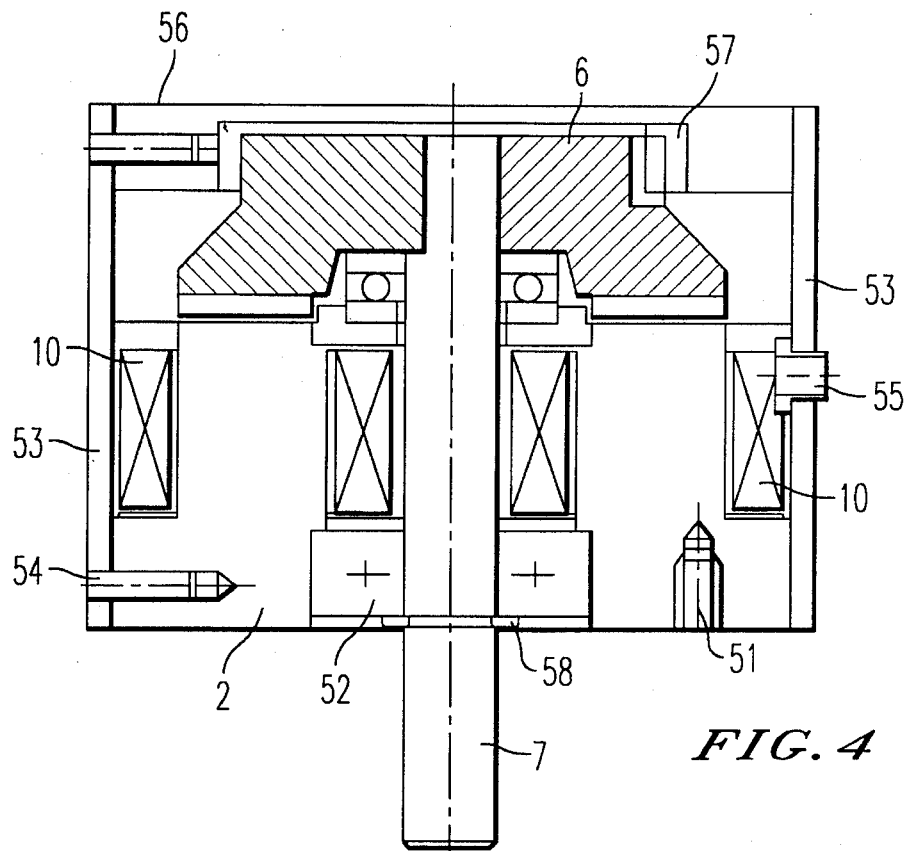
FIG. 4 is an axial cross-section of a first modification of the invention.

FIG. 4 shows a first modification of the actuator according to the invention which facilitates the attachment of the actuator to a mechanical support. The coupling shaft 7 does not extend on the side opposite the stationary device 2, as in the example described above, but rather runs through the stationary device 2. This embodiment makes it possible to reduce the thickness of the actuator according to the invention. The movable stator element 6 is conical, so as to reduce the inertia of the movable device, while allowing satisfactory passage of the magnetic flux. The actuator according to this variant further allows relatively simple attachment to a support. This attachment is produced using threaded attachment holes 51 provided in the solid part of the stator component 2. A bearing 52 limits the lateral play of the shaft 7. The actuator is mounted in a casing 53 made of a mold plastic or non-magnetic (or virtually non-magnetic) metal. A pin 54 immobilizes the stationary stator element 2 in relation to said casing 53. A lateral opening 55 allows passage of the wires feeding the electric coils 10. The cover 56 of the casing 53 comprises a stop 57 limiting the angle of rotation of the rotor 1. A circular clip 58 mounted on the shaft 7 restricts the amplitude of axial play and prevents a force generated too violently on the end of the shaft from causing damage to the movable device or the cover. This circular clip is not, however, designed to position the movable device 6 axially in relation to the stator 2, this positioning being ensured basically by the magnetic phenomena explained previously.

Figure 5:
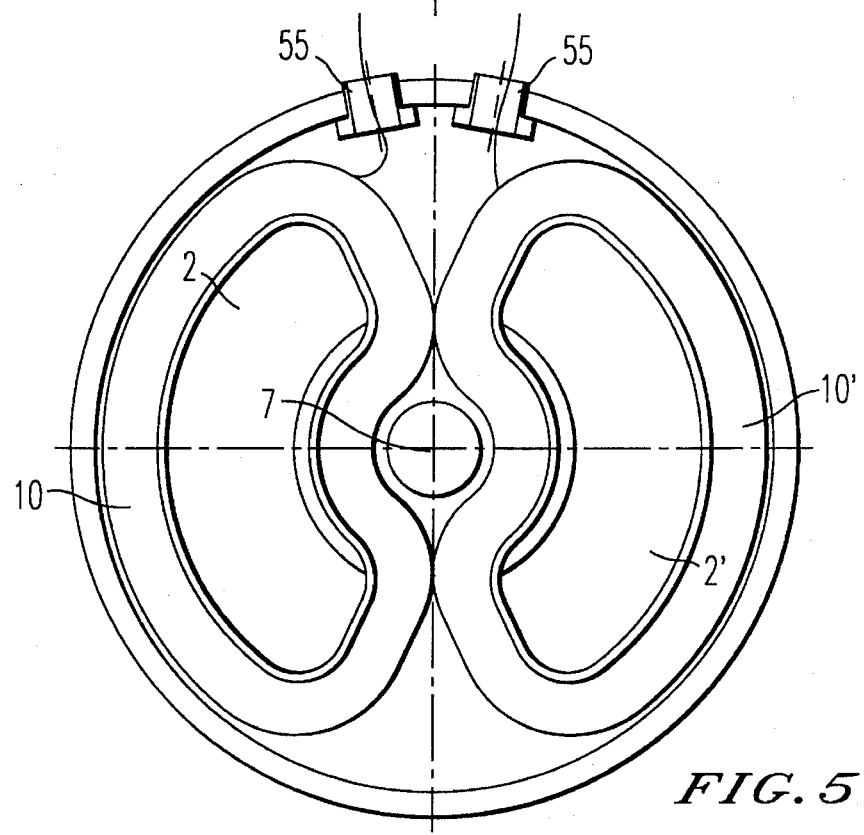
FIG. 5 is a transverse cross-section of the actuator according to the preceding modification.

FIG. 5 is a transverse cross-section of the actuator according to the modification described above and embodies the case in which N=1, i.e., in which the actuator comprises two polar parts. This figure illustrates more specifically the shape of the polar parts of the stationary stator 2, as well as the shape of the coils 10 and 10'. The two coils 10 and 10' enclose the two polar parts 2 and 2', respectively, while avoiding the duct through which the shaft 7 passes.

Figure 6:
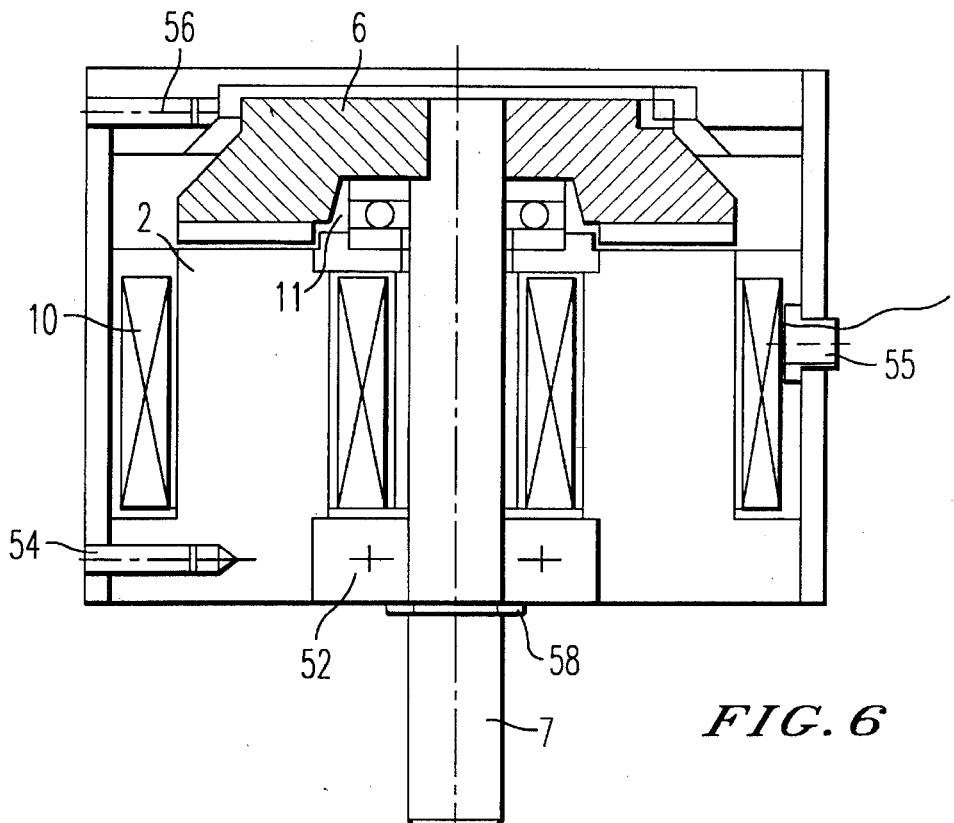
FIG. 6 is an axial cross-section of a second modification.
Figure 7:
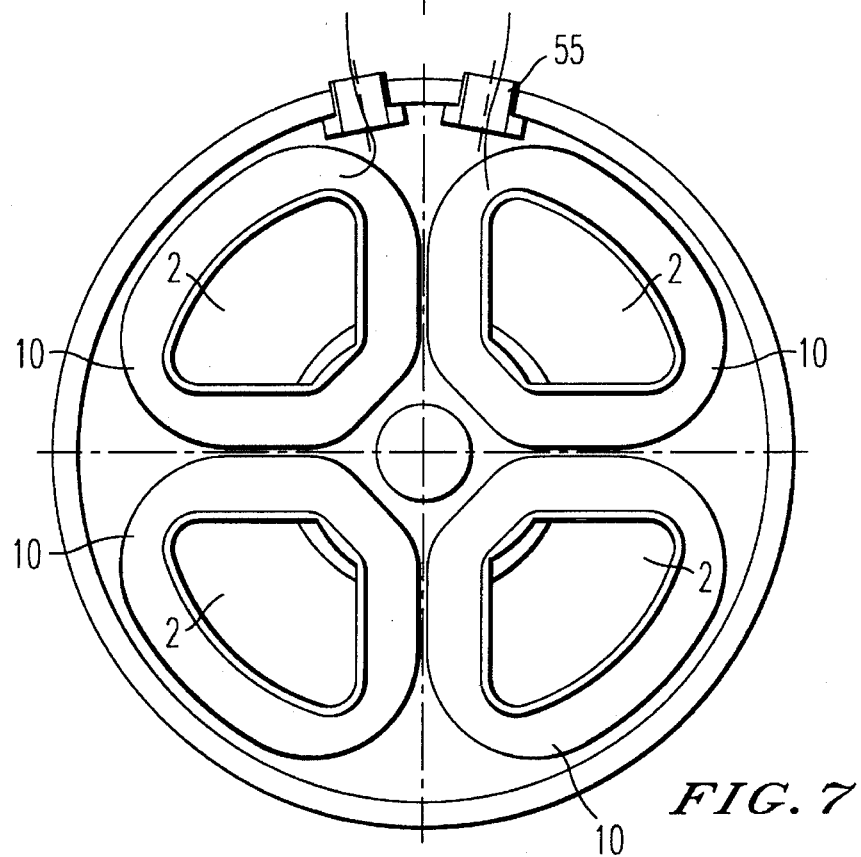
FIG. 7 is a transverse cross-section of the preceding modification.

FIGS. 6 and 7 illustrate a second modification in which N= 2, i.e., incorporating four poles. The axial cross-section reveals few differences from the axial cross-section of the preceding embodiment. FIG. 7 illustrates the shape of the stationary stator element 2 and of the coils 10 composed of four lobes enclosing the four poles of the stator 2, while avoiding the central passage through which the shaft 7 extends.

Of course, the present invention is not restricted to the embodiments described in the preceding description, but, to the contrary, encompasses all of modifications conceivable to the specialist.

We claim:

1. Single-phase constant torque electromagnetic actuator, comprising:

a coupling shaft having a longitudinal axis;

a bore shaped movable device having a longitudinal axis and a flat annular surface, the movable device rigidly attached to the coupling shaft such that the longitudinal axis of the coupling shaft is aligned with the longitudinal axis of the movable device;

an annular magnetic disk fixed on the flat annular surface of the movable device, the magnetic disk having poles magnetized in alternating axial directions;

a stationary device including a stator circuit made of a high-permeability magnetic material and a trip coil for exciting the stator circuit, the stator circuit cylindrically shaped and having an outer diameter equal to an outer diameter of the magnetic disk, wherein the stationary device remains stationary with respect to the movable device;

a thrust ball bearing including an annular ball race and ball bearings positioned within the ball race, the thrust ball bearing fixed to the stationary device, the ball race having an outer diameter equal to an inner diameter of the magnetic disk;

wherein the movable device is detachably engaged in close proximity with the stationary device such that a uniform space is formed at every point between the magnetic disk and the stationary device, thereby magnetically coupling the magnetic disk to the stator circuit, the outer diameter and the inner diameter of the magnetic disk aligned with the outer diameter and an inner diameter of the stator circuit, respectively, the movable device rotatable about a rotational axis with respect to the stationary device, wherein the movable device cannot move in a lateral direction to the stationary device, but is free to tilt at an offset to the rotational axis;

a lever formed by a portion of the movable device disengaged from the ball bearings by the offset to the rotational axis; and a fulcrum formed by some of said ball bearings engaged with the movable device when the rotational axis is offset, wherein a magnetic force generated by magnetic coupling of the magnetic disk to the stator circuit acts upon the lever and the fulcrum in a direction which corrects the offset of the rotational axis.

2. Single-phase electromagnetic actuator according to claim 1, wherein a width of the actuator is 1 cm and the uniform space is several tenths of millimeters.

3. Single-phase constant torque electromagnetic actuator comprising a stationary device comprising of a first magnetic stator circuit made of a high-permeability material excited by at least one trip coil and a movable device including an axially-magnetized disk and having 2N pairs of magnetic stator poles magnetized in an alternating direction, magnetization being virtually uniform, said magnetized disk being coupled to a second magnetic circuit made of a magnetic high-permeability and aid movable device being rigidly attached to a coupling shaft, wherein the stationary device and the movable device are separated by a distance which permits at least axial play of the coupling shaft in a direction opposite the stationary device and a diameter of the magnetized disk is substantially identical to a diameter of the stator poles of the stator circuit, the play between the stationary device and the movable device being counterbalanced by magnetic attraction of the stationary device on the movable device;

wherein the movable device works in conjunction with and is separated from the stationary device by means of a thrust ball bearing restricting motion of the movable device toward the stationary device; and wherein an external surface of the thrust ball bearing is substantially coplanar with a plane passing through an end of the stationary device facing the magnetized disk, the disk comprising a central recess disk whose diameter is at least equal to a diameter of the thrust ball bearing.

* * * * *